3,740,290
COLOR BOND SURVEILLANCE SYSTEM
David H. Kelsey, Van Nuys, and Charles W. Putzier and John M. McColgan, Los Angeles, Calif., assignors to R & G Sloane Manufacturing Company, Inc., Los Angeles, Calif.
No Drawing. Continuation-in-part of abandoned application Ser. No. 108,204, Jan. 20, 1971. This application Apr. 15, 1971, Ser. No. 134,422
Int. Cl. B32b 7/12; C09j 5/04
U.S. Cl. 156—310                                                    27 Claims

ABSTRACT OF THE DISCLOSURE

A color bond surveillance system to ensure that adequate adhesive bonding has been accomplished between two surfaces where such adequate adhesive bonding requires the application of separate coatings to each of the mating surfaces, such as a primer coating in addition to the adhesive coating, wherein each of the required separate coatings applied to the mating surfaces contains a different color-precursor compound. The different color-precursor compounds in the coatings applied directly to the mating surfaces are reactive each with the other to produce a color different from the colors of the precursors and coating materials. More than two different color-precursor compounds may be required for the reaction producing the desired color. In such case the additional required reactive color-precursor component or components may be incorporated into one of the coatings directly applied to one of the two mating surfaces or into additional coatings, such as an adhesive coating, applied over the primary coating on one or both of the mating surfaces. After proper application of the separate coatings separately containing the color-developing additives and contacting of the so-treated surfaces to be bonded, the color-precursor components react to produce the desired color, thereby demonstrating proper adhesive installation.

CROSS-REFERENCE TO RELATED APPLICATION

This application is a continuation-in-part application of Ser. No. 108,204, filed Jan. 20, 1971, now abandoned.

A method for ensuring proper application of separate liquid coatings required to accomplish the satisfactory adhesion of two mating surfaces comprising separately incorporating into at least two of the required separate coatings different color-precursor compounds reactive with each other to produce a color different from the colors of the precursors and coatings, applying one of the coatings containing a color-precursor compound to one of the mating surfaces, applying a coating containing a different color-precursor compound to the other mating surface, applying additional coatings as required to one or both of the coated mating surfaces, and superimposing the coated surfaces.

BACKGROUND OF THE INVENTION

It is frequently necessary to join separate components or items by adhesive bonding. Such requirements as, for example, in lamination and the assembly of plastic, ceramic, wood, and metal devices are well known. The invention herein is applicable to any such adhesive bonding wherein the accomplishment of a satisfactory adhesive bond requires the application of one or more separate coatings of liquid adhesive composition and/or liquid primer and liquid adhesive composition to each of the surfaces to be adhered. It is particularly useful in the case of adhesive bonding required to form joints between two items or components of a system wherein failure of the adhesive bond can result in leakage or other failure of the system. An example of such bonding is that between plastic pipe and plastic pipe fittings in a liquid or gas-carrying system.

Failure or inadequacy of an adhesive bond is frequently caused by oversight or negligence on the part of the workman, who may omit the application of one or more of the required coatings, such as the primer, or permit the applied liquid coatings to become excessively dry before successive coatings or mating of the coated surfaces. Such improper adhesive installation generally results immediately or eventually in failure of the adhesive bond.

The invention herein provides a visible surveillance means for determining whether the adhesive bonding requirements have been properly met by the development of a desired color in the finished bond. Dyes and pigments in their final color state have previously been incorporated into adhesives to show, for example, the positioning and quantity of applied adhesive, as disclosed in U.S. Pat. No. 3,197,350. U.S. Pat. No. 2,405,602 discloses a method for giving a visual indication of the adequacy of reactivation of dried and hardened adhesive on a shoe sole prior to adhesion of the shoe upper by including in the reactivating solvent a color indicator reactive with the filler in the dried adhesive. Development of the color in the adhesive indicates the adhesive has been sufficiently reactivated for the subsequent attachment of the sole to the upper. However, none of the available prior art discloses the use at the least of separate and different reactive color-precursor components in the separate coatings of the adhesive system directly applied to the mating surfaces and additionally in other superimposed coatings as required or provide a surveillance system which can demonstrate, by a color change after installation has been completed, that all required coatings had been properly applied to produce an adequate adhesive bond.

An object of the invention is to provide a color bond surveillance system for monitoring the adequacy of the adhesive bond between two adhesively bonded surfaces in cases where the formation of a satisfactory bond requires the application of at least one or more coatings to each of the surfaces to be adhered.

Another object is to provide a color bond surveillance system effective after completion of the installation to determine whether the plural coatings required for a satisfactory adhesive bond have been applied during the adhesive installation.

Still another object is to provide a color bond surveillance system to determine the adequacy of the completed adhesive installation bonding the joints of mated plastic pipe and/or fitting units.

Another object is to provide a color bond surveillance system for monitoring the adequacy of the completed adhesive installation bonding the joints of mated transparent plastic pipe and/or fitting units.

Still another object is to provide a method for adhesively bonding surfaces which ensures the proper application of separate coatings required to accomplish satisfactory adhesion of the bonded surfaces.

Other objects and advantages will become obvious from the following detailed description.

SUMMARY OF THE INVENTION

The invention relates to an adhesive installation system which comprises a plurality of fluid coating compositions, at least one of which is a fluid adhesive, and at least two of which are separately applied directly to each of the mating surfaces to be adhered and comprises the improvement wherein different color-precursor components reactive each with the other are separately incorporated into at least the coatings, such as primers, which are applied directly to the mating surfaces. Additional different color-precursor components reactive with the aforementioned color-precursors can be incorporated into additional required coatings, such as adhesive, which are applied over the initial coatings.

When the surfaces bearing the coatings separately containing the reactive color-precursor compounds are placed in superimposed contact, the reactive compound in one coating reacts with reactive compound in another coating to produce the desired color. Development of the color shows that the requisite coatings for a satisfactory adhesive bond have been applied during the adhesive installation.

The aforedescribed color bond surveillance process is particularly useful where at least the exteriorly visible one of the items being adhesively bonded is transparent or translucent so that the color change is immediately visible. It is also useful in the bonding of opaque items as a future means for determining whether failure of the bonded items was caused by improper adhesive installation or because of flaws in the items which were bonded.

DESCRIPTION OF THE PREFERRED EMBODIMENTS

The compounds reactive to produce the desired color can be any color-precursors or intermediates well known in the chemical, dye, and pigment arts, it being essential only that the reactive compound in one of the coatings react with the compound in another of the coatings to produce a perceptible color change. The number of reactive compounds necessary to produce a product having the desired color may be two or more depending on the particular color-precursor system employed. Components such as alkaline buffers, catalysts, and the like, which are essential to the primary reaction are considered reactive color-precursor compounds for the purpose of this specification and claims. Preferably the color-precursor reagents selected are soluble in and compatible with the particular primer or adhesive coatings.

The color-precursor reactive compounds can be organic or inorganic compounds which react to form compounds of different colors.

They can be, for example, a pH indicator compound such as phenol-phthalein, thymol blue, or nitramine, incorporated into one of the coatings and an alkaline compound, such as an organic amine or alkaline salt, incorporated into the other coating, or reagents such as an amino acid and ninhydryn which react to produce a blue compound.

Particularly useful are the reactive diazo dye intermediates, namely reactive diazo bases and reactive phenolic developers or couplers which react to produce the well-known azo dyes. Many reactive diazo bases and reactive phenolic couplers are available which are soluble in water or organic solvents as required by the particular coating compositions.

Examples of such reactive diazo bases include: diazotized p-nitraniline, diazotized sulfanilic acid, diazotized naphthionic acid, 4-diazo-2,5-diethoxyphenyl morpholine $BF_4$, 4-diazophenyl morpholine $BF_4$, p-diazo-o-chloro-N,N'-diethyl aniline $BF_4$, 4-diazo-2,5-diethoxyphenyl morpholine $\frac{1}{2}ZnCl_2$, 4-diazophenyl morpholine $\frac{1}{2}ZnCl_2$. The borofluoride salt derivatives are particularly useful in organic solvent based coatings because of their solubility therein.

Examples of reactive phenolic coupling agents include: α- and β-naphthol, naphtholsulfonic acids, aminonaphthosulfonic acids, 2,3-dihydroxy-naphtholsulfonic acids, 2,3-dihydroxy-naphthalene, 3,5-resorcyclic acid ethanolamide, 4-bromo-3,5-resorcyclic acid.

It is sometimes advisable to include a third reagent, such as an alkaline buffer or catalyst to facilitate reaction of the reactive color-precursor intermediates. In the case of some of the diazo base-phenolic coupler systems, an alkaline buffer, such as an organic mono-, di- or tertiary-alkylamine, e.g. butylamine, diisopropylamine, dimethylsoyamine, tributylamine, dimethyldodecylamine, and the like, may be required. Tertiary amine buffers are particularly desirable in cases where the stability of a lower amine, such as a monoamine may be adversely affected by a component, such as a ketone solvent, employed in the adhesive system. The third component of the color reactive system can be incorporated into the coating composition separately containing the phenolic coupler or separately into a third coating composition required by the particular adhesive system, thereby providing assurance that all three coatings were properly installed.

The concentration of the reactive color-precursor compounds incorporated into the coating compositions will vary with the particular compositions and precursors and requires only routine experimentation for the determination of optimum concentrations for a particular application.

The adhesive bonding systems may be any conventional system which requires at least two coating applications for satisfactory bonding of two surfaces. Such systems are well known in the adhesive bonding art and, as is also well known, vary with the nature and composition of the surfaces being bonded. In many cases, both of the surfaces to be bonded require a conditioning treatment with a primer coating prior to application of the adhesive coating. The primer composition employed where both surfaces require conditioning may be the same or different, again depending on the nature and composition of the two surfaces to be bonded. In some cases, a primer may not be required but a satisfactory bond requires the separate application of a coating of the adhesive to each surface.

The term adhesive as used herein includes any liquid coating composition which is capable of forming a bond or weld between two superimposed surfaces. It includes natural and synthetic adhesives such as animal and casein glues, epoxies, phenol-aldehydes, urea-aldehydes, polyesters, furanes, asphaltic compounds, sodium silicates, polyvinyl acetate, and the like. They also include solvent cements such as volatile solvent solutions of polyvinyl chloride, acrylonitrile-butadiene-styrene polymers, cellulose acetate, and the like, which act as welds for solvated plastic surfaces.

The adhesives may be solutions, emulsions, or slurries in an aqueous or volatile organic liquid vehicle, such as ethanol, methanol, methyl ethyl ketone, acetone, tetrahydrofurane, and the like.

The primer can be any conventionally employed liquid composition which prepares the surface of the articles to be bonded for satisfactory adhesive bonding. It may be a volatile organic cleaning solvent or volatile organic solvent which softens or dissolves the surface. It may also be an aqueous or organic solvent solution containing a component which improves the bond between the adhesive and the surface to be bonded.

The reactive color-precursor compounds are separately added to and admixed with at least the two coatings required for direct application to the mating surfaces, such as the primers which are the most likely to be omitted during the adhesive installation. For example, in a system requiring a primer coating on each surface prior to application of the adhesive coating, one of the reactive color-precursor compounds is added to one primer composition and a second color-reactive compound to the other primer composition. The primer compositions may otherwise be the same or different depending on the particular surfaces being treated. If a third color-precursor component, including, for example, a buffer or catalyst compound, is required for reaction of the two reactive color intermediates it can be added to a third coating, e.g. the adhesive, in the particular adhesive bonding system or can be incorporated with one of the other intermediates in the same coating. The precursor components can be added separately to any of the coatings. In cases where proper installation requires a coating of adhesive on each surface to be bonded, one portion of the adhesive coating can contain one of the reactive color precursors and a second portion can contain the second reactive intermediate.

When all coatings containing the separate reactive color-precursors are properly and successively applied and the coated surfaces are brought into superimposed contact, the reactive color-precursor components are brought into contact in adjacent coatings or migrate through intermediate coatings to form the desired color. Omission of a required coating and, thereby, one of the color intermediates will not produce the desired color change.

Optimum bonding generally requires that at least the adhesive and preferably also the primer coatings be wet, namely in fluid or semi-fluid state. This also facilitates reaction and migration of the reactive color-precursor intermediates. Thus the color bond surveillance system described herein also provides a means for determining whether the coatings were in the required state during successive coating applications and superimposed contact of the coated surfaces.

The color bond surveillance system is particularly useful when employed in the adhesive bonding of items at least the outer one of which is transparent or translucent, since the color change showing the adequacy of the adhesive installation is immediately visible. It is, however, also useful in the bonding of opaque surfaces. Where the adhesive bonding extends to an edge or edges of the bonded surfaces, the color change (or absence of color change) is visible at such points. It also assists in determining cause of failure of a bonded opaque joint after disassembly.

The system has particular application in the solvent cementing of plastic pipe and fittings. Such pipe and fittings, when made of a solvent-soluble plastic, such as polyvinyl chloride or acrylonitrile-butadiene-styrene polymer are generally joined by means of a welding cement comprising a solution of the particular pipe or fitting polymer in a volatile solvent which dissolves the joinder surfaces of the pipe and/or fittings. After mating of the solvent-cement coated ends of the pipe and/or fittings, the solvent evaporates leaving a solid, fused joint.

In many cases and very particularly in the case of polyvinyl chloride pipe and fittings, the joinder surfaces require primer treatment with an appropriate solvent or mixture of solvents to soften and dissolve them prior to application of the solvent cement. The primer coated surface must also be still wet or fluid at the time of application of the cement coating and the cement coating must still be wet or fluid at the time of mating contact of the pipe and/or fitting. Selection of reactive color-precursor compounds which react substantially only while in solvent solution provides a monitoring system as to condition of the coatings during installation, since little or no color will develop if any of the coatings are permitted to dry excessively. Failure by the installer to apply either or both of the primer coatings or to follow instructions as to the condition of the applied coatings, can result in failure of the bonded joint and leakage in the pipe system.

The color bond surveillance system provides a rapid and effective visible inspection means for determining adequacy of the bonded joint, particularly if the outer mating member, e.g. the pipe fitting, is made of clear transparent plastic, e.g. transparent polyvinyl chloride. Proper color development may also be visible through a translucent plastic. In case the outer joinder surface is opaque, proper use of all of the required coatings may be monitored by the color of the cement which generally extrudes beyond the end of the fitting socket.

EXAMPLE 1

The following primer and solvent cement coatings were employed for bonding transparent colorless polyvinyl chloride fittings to white opaque polyvinyl chloride pipe:

Primer A: solution of 0.3% 4-diazo-2,5-diethoxyphenyl morpholine borofluoride in tetrahydrofuran.
Primer B: solution of 0.2% dihydroxy naphthylene and 0.1% n-butylamine in tetrahydrofuran.
Cement: commercial solution of polyvinyl chloride in tetrahydrofuran.

Primer A was applied to the interior surface of the fitting mating socket in amount sufficient to soften and dissolve the polyvinyl chloride surface. Primer B was similarly applied to the exterior of the male mating pipe end. A coating of the solvent cement was separately applied to the primer-coated surfaces of the pipe while the primer coatings were still soft and fluid. The coated pipe and fitting ends were superimposed in mating contact while the cement was still wet. A color change visible through the transparent fitting developed in the bond within a minute after completion of the adhesive installation, thereby demonstrating proper installation. The blue color characteristic of the particular azo dye was substantially fully developed within several hours.

The above adhesive system was applied to pipe and fitting sizes ranging from one to eight inches in diameter with success in all cases.

EXAMPLE 2

The procedure of Example 1 was followed except that both the fitting and pipe were made of opaque polyvinyl chloride. The joint was disassembled after the bond had dried. The bonding cement was blue, thereby demonstrating proper installation.

EXAMPLE 3

The procedure of Example 1 was followed except that the alkaline n-butyl amine buffer was added to the solvent cement instead of Primer B.

Similar results were obtained as in Example 1.

EXAMPLE 4

The procedure of Example 1 was followed except that the coupling agent employed was 3,5-resorcylic acid ethanolamide.

A red color developed in the bond demonstrating satisfactory installation.

EXAMPLE 5

The procedure of Example 1 was followed except that the coupling agent employed was 4-bromo-3,5-resorcylic acid.

A red color developed in the bond demonstrating satisfactory installation.

EXAMPLE 6

The procedure of Example 1 was followed except that Primer A was a solution of 0.6% of the same diazo color-precursor compound in a mixture of tetrahyrofuran and cyclohexanone; and Primer B was a solution of 0.6% dihydroxy naphthalene and 0.6% dimethylsoyamine in a mixture of tetrahydrofuran and cyclohexanone.

Within about a minute after completion of the adhesive installation, a blue color developed in the bond which was visible through the outer transparent fitting.

EXAMPLE 7

The procedure of Example 6 was followed except that a different tertiary amine, dimethyl dodecylamine, was employed. Similar results were obtained.

Although this invention has been described with reference to illustrative embodiments thereof, it will be apparent to those skilled in the art that the principles of this invention can be embodied in other forms but within the scope of the claims.

We claim:

1. In a method for adhesively bonding two surfaces wherein effective bonding require the separate application of at least two liquid coatings and the application of one of said coatings to one of said surfaces and another of said coatings to the other of said surfaces prior to the superimposed contact of said surfaces bearing said coatings, at least one of said liquid coatings being a liquid adhesive composition, the improvement comprising:

(1) applying one of said coatings directly to one of said two surfaces, said one coating containing a first color-precursor compound reactive with at least a second color-precursor compound to produce a desired color, (2) applying one other of said coatings directly to the other of said surfaces, said one other coating containing said at least second color-precursor compound, (3) applying from zero to at least one additional liquid coating to at least one of the two coated surfaces, and (4) superimposing said surfaces bearing said coatings, whereby the color-precursor or compounds in said coatings react to produce a desired color.

2. The method of claim 1 wherein the coatings applied directly to each of the two surfaces are primer coatings and at least one adhesive coating is applied to at least one of the primer-coated surfaces.

3. The method of claim 2 wherein said at least one adhesive coating contains a third color-precursor compound reactive with and different from the color-precursor compounds in each of the primer coatings.

4. The method of claim 2 wherein the first color-precusor compound is a diazo base and the second color-precursor is a phenolic developer compound.

5. The method of claim 4 wherein the coating containing the phenolic developer compound also contains an alkaline buffer compound.

6. The method of claim 3 wherein the first, second, and third different color-precursor compounds consist of and are each randomly selected from the following group: diazo base, phenolic developer compound, and alkaline buffer compound.

7. The method of claim 5 wherein the alkaline buffer compound is an alkyl amine.

8. The method of claim 6 wherein the alkaline buffer compound is an alkyl amine.

9. The method of claim 7 wherein the alkyl amine is butyl amine.

10. The method of claim 8 wherein the alkyl amine is butyl amine.

11. The method of claim 7 wherein the alkyl amine is a tertiary amine.

12. The method of claim 8 wherein the alkyl amine is a tertiary amine.

13. The method of claim 1 wherein the two surfaces are the mating surfaces forming the joint between plastic pipes and/or plastic pipe fittings.

14. The method of claim 2 wherein the two surfaces are the mating surfaces forming the joint between plastic pipes and/or plastic pipe fittings.

15. The method of claim 3 wherein the two surfaces are the mating surfaces forming the joint between plastic pipes and/or plastic pipe fittings.

16. The method of claim 4 wherein the two surfaces are the mating surfaces forming the joint between plastic pipes and/or plastic pipe fittings.

17. The method of claim 5 wherein the two surfaces are the mating surfaces forming the joint between plastic pipes and/or plastic pipe fittings.

18. The method of claim 6 wherein the two surfaces are the mating surfaces forming the joint between plastic pipes and/or plastic pipe fittings.

19. The method of claim 13 wherein the plastic pipes and/or fittings are made of polyvinyl chloride.

20. The method of claim 14 wherein the plastic pipes and/or fittings are made of polyvinyl chloride.

21. The method of claim 15 wherein the plastic pipes and/or fittings are made of polyvinyl chloride.

22. The method of claim 19 wherein the plastic pipe and/or plastic pipe fitting forming the outer surface of said joint is made of transparent polyvinyl chloride.

23. The method of claim 20 wherein the plastic pipe and/or plastic pipe fitting forming the outer surface of said joint is made of transparent polyvinyl chloride.

24. The method of claim 21 wherein the plastic pipe and/or plastic pipe fitting forming the outer surface of said joint is made of transparent polyvinyl chloride.

25. In a method for adhesively bonding two surfaces wherein at least one liquid coating is applied to one of said surfaces and another liquid coating is applied to the other of said surfaces prior to superimposing said surfaces, at least one of said liquid coatings being a liquid adhesive composition, the improvement comprising:

(1) applying a first coating to one of said surfaces, said first coating containing a first color-precursor compound;

(2) applying a second coating to the other of said surfaces, said second coating containing a second color-precursor compound reactive with said first color-precursor compound to produce a desired color; and (3) causing said first and second color-precursor compounds to react to produce a desired color by superimposing said surfaces bearing said coatings.

26. The method of claim 25 wherein at least one additional liquid coating is supplied to at least one of said surfaces prior to superimposing said surfaces.

27. The method of claim 25 wherein at least one of said coatings contains more than one color-precursor compound.

References Cited
UNITED STATES PATENTS

| | | | |
|---|---|---|---|
| 2,405,602 | 8/1946 | Nugent | 156—64 |
| 3,267,064 | 8/1966 | Ravve et al. | 260—38 |
| 3,380,987 | 4/1968 | Palm et al. | 260—141 |

ALFRED L. LEAVITT, Primary Examiner

R. A. DAWSON, Assistant Examiner

U.S. Cl. X.R.

117—62.1; 138—146; 156—64, 309; 161—188; 260—141